US008015043B2

(12) United States Patent
Cao et al.

(10) Patent No.: US 8,015,043 B2
(45) Date of Patent: Sep. 6, 2011

(54) METHOD AND APPARATUS FOR WORKFORCE DEMAND FORECASTING

(75) Inventors: Heng Cao, Yorktown Heights, NY (US); Mark A. Eaton, Ridgewood, NJ (US); Meng-Chen Hsieh, Croton on Hudson, NY (US); Jianying Hu, Bronx, NY (US); Ta-Hsin Li, Danbury, CT (US); Bonnie Kathryn Ray, Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 11/669,182

(22) Filed: Jan. 31, 2007

(65) Prior Publication Data

US 2008/0183553 A1 Jul. 31, 2008

(51) Int. Cl.
*G06Q 10/00* (2006.01)
(52) U.S. Cl. .................................... 705/7.12; 705/7.31
(58) Field of Classification Search ............. 705/8, 7.12, 705/7.31
See application file for complete search history.

(56) References Cited

U.S. PATENT DOCUMENTS

| 6,067,525 | A  | * | 5/2000  | Johnson et al. ................. 705/10 |
| 6,609,101 | B1 | * | 8/2003  | Landvater ..................... 705/7.25 |
| 6,636,852 | B2 | * | 10/2003 | Gozdeck et al. ................ 705/11 |
| 6,820,060 | B1 | * | 11/2004 | Eisner ............................ 705/10 |
| 6,957,186 | B1 | * | 10/2005 | Guheen et al. ................. 705/323 |
| 7,080,026 | B2 | * | 7/2006  | Singh et al. .................... 705/7.31 |
| 7,139,720 | B1 | * | 11/2006 | Foell et al. ......................... 705/8 |
| 7,379,064 | B2 | * | 5/2008  | Raffel et al. .................... 345/440 |
| 7,412,398 | B1 | * | 8/2008  | Bailey ........................... 705/7.31 |
| 7,739,137 | B2 | * | 6/2010  | Jagtiani et al. .................... 705/8 |
| 7,797,182 | B2 | * | 9/2010  | Lindquist et al. ............. 705/7.31 |
| 7,844,480 | B2 | * | 11/2010 | Ricketts ............................ 705/8 |
| 2002/0065700 | A1 | * | 5/2002  | Powell et al. ...................... 705/9 |
| 2002/0169657 | A1 | * | 11/2002 | Singh et al. ..................... 705/10 |
| 2003/0033191 | A1 | * | 2/2003  | Davies et al. .................... 705/10 |
| 2004/0064360 | A1 | * | 4/2004  | Meggs ............................ 705/10 |
| 2004/0098292 | A1 | * | 5/2004  | Miller et al. ....................... 705/8 |
| 2004/0162749 | A1 | * | 8/2004  | Vogel et al. ........................ 705/8 |
| 2004/0243459 | A1 | * | 12/2004 | Geritz et al. ..................... 705/10 |
| 2006/0129447 | A1 | * | 6/2006  | Dockery et al. ................. 705/10 |
| 2006/0167732 | A1 | * | 7/2006  | Ricketts ............................ 705/8 |
| 2006/0178918 | A1 | * | 8/2006  | Mikurak ........................... 705/7 |
| 2006/0184414 | A1 | * | 8/2006  | Pappas et al. ................... 705/10 |
| 2007/0226679 | A1 | * | 9/2007  | Jayamohan et al. .......... 717/101 |
| 2008/0004936 | A1 | * | 1/2008  | Fama et al. ........................ 705/9 |
| 2008/0103868 | A1 | * | 5/2008  | Santos et al. ...................... 705/9 |

OTHER PUBLICATIONS

Trailer, Barry; Vavricka, Joe; "Implementing a Formal Selling Process and Performance Measures in a Sales Organization", (c) 1997, Trailer Vavricka, Inc. Solana Beach Ca, pp. 1-21.*

Baysan, et al. "The Design and Development of a Sales Force Automation Tool using Business Process Management Software", Proceedings of the 2005 Systems and Information Engineering Design Symposium, pp. 318-327.*

* cited by examiner

*Primary Examiner* — Jonathan G Sterrett
(74) *Attorney, Agent, or Firm* — McGinn Intellectual Property Law Group, PLLC

(57) ABSTRACT

A method of forecasting workforce demand, includes forecasting an ongoing engagements demand, forecasting an opportunities demand, forecasting a wedge engagements demand, representing a result of the forecasting the ongoing engagements demand as a first workforce demand statement, a result of the forecasting the opportunities demand as a second workforce demand statement, and a result of the forecasting the wedge engagements demand as third workforce demand statement, and integrating the first workforce demand statement, the second workforce demand statement and the third workforce demand statement to generate an overall workforce demand forecast.

1 Claim, 1 Drawing Sheet

METHOD AND APPARATUS FOR WORKFORCE DEMAND FORECASTING

BACKGROUND OF THE INVENTION

1. Field of the Invention

The present invention relates to a method and apparatus for forecasting a workforce demand. In particular, the present invention describes a method and system for forecasting a workforce demand that is capable of integrating information regarding different factors.

2. Description of the Related Art

Workforce management and planning are significant drivers of profitability for many businesses, especially for those with a large number of employees and complex product/solution portfolios. As a key component in the workforce management process, the objective of workforce demand forecasting is to predict how many people of what skill categories are going to be required throughout a given period of time (e.g., a quarter). An accurate forecast on the workforce demand provides crucial input to many business decision processes, including skills capacity planning (determining what level of workforce of what particular skill mix should be maintained), deployment decisions (who to assign to what project), and sales strategies (what particular solution should be pushed based on available resources).

In the increasingly complex business environment, workforce demand is not determined by any single factor, but influenced by many factors with varying degrees of uncertainty, including status of ongoing engagements, potential signings, revenue targets, market trends, etc. Because of such complexity, existing resource forecasting methods such as the ones used for forecasting computing resource data are not adequate, as they mostly rely on extrapolation based on past resource requirements and do not provide ways to incorporate other factors. Thus, a more comprehensive method for workforce demand forecasting is needed.

SUMMARY OF THE INVENTION

In view of the foregoing and other exemplary problems, drawbacks, and disadvantages of the conventional methods and structures, an exemplary feature of the present invention is to provide a method and system for forecasting a workforce demand that is capable of integrating information regarding different factors.

In accordance with a first aspect of the present invention, a method of forecasting workforce demand, includes forecasting an ongoing engagements demand, the ongoing engagements comprising engagements having a revenue commitment and an end date, forecasting an opportunities demand, the opportunities comprising engagements that are in different stages of a sales process and may become signed engagements during a forecasting period and incur on a demand on the workforce, forecasting a wedge engagements demand, the wedge engagements comprising engagements in the forecasting period that are neither ongoing engagements nor opportunities at a forecasting time, representing a result of the forecasting the ongoing engagements demand as a first workforce demand statement, a result of the forecasting the opportunities demand as a second workforce demand statement, and a result of the forecasting the wedge engagements demand as third workforce demand statement, each of the first workforce demand statement, the second workforce demand statement and the third workforce demand statement describes a workforce demand at an engagement level and reflects uncertainties contained in each of the ongoing engagements demand, the opportunities demand and the wedge engagements demand, each of the first workforce demand statement, the second workforce demand statement and the third workforce demand statement includes start date and end date statistics, including information regarding the start date and the end date of the engagement, and staffing plans, the staffing plans including information regarding work hours required for each skill category throughout the engagement, and integrating the first workforce demand statement, the second workforce demand statement and the third workforce demand statement to generate an overall workforce demand forecast.

The present invention is directed to a method of forecasting a workforce demand that is capable of integrating information regarding different factors, thus providing a more accurate and comprehensive forecast of the overall demand. The method provides a unified framework to tie together information regarding ongoing projects, likely demand for future engagements and revenue targets, and transforms these different quantities into work hour demands for different skill categories.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
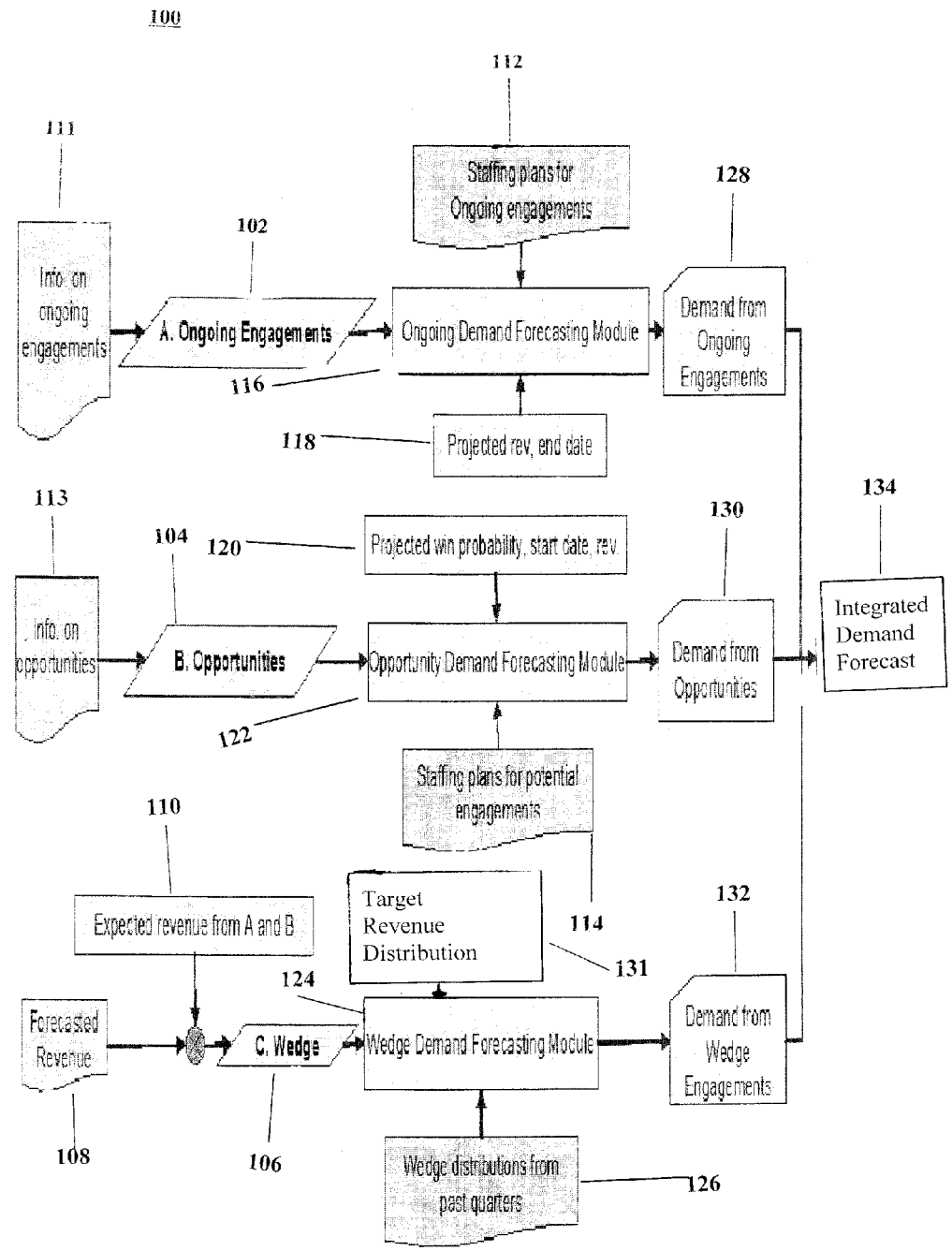
FIG. 1 illustrates a flowchart of the integrated workforce demand forecasting method 100 in accordance with an exemplary embodiment of the present invention.

Referring now to the drawings, and more particularly to FIG. 1, there are shown exemplary embodiments of the method and structures according to the present invention.

For purposes of the present invention, the term forecasting time refers to the time when a demand forecast for a future period needs to be generated, and the term forecasting period refers to the period in the future for which one needs to determine the forecasted workforce demand. For example, a typical scenario is for a company/firm to forecast the workforce demand for each quarter one month before the quarter starts, in which case the "forecasting time" is one month before the quarter, and "forecasting period" is the quarter.

The present method recognizes that the overall workforce demand consists of work hours required to carry out three types of engagements (e.g., as depicted in FIG. 1). The three types of engagements include ongoing engagements 102, opportunities 104 and wedge engagements 106.

Some of the ongoing engagements 102 may be critical ones for which there is firm revenue commitment for the forecasting period and firm end date. Other engagements may be less important projects with more flexible end dates and revenue commitments.

Opportunities 104 are engagements that are still in different stages of the sales process and could potentially become signed engagements during the forecasting quarter and thus, incur demand on the workforce.

Wedge engagements 106 are defined as engagements in the forecasting period that are neither ongoing nor opportunities at forecasting time.

These three components are tied together through the total expected (forecasted) revenue (R) 108 for the forecasting quarter in the following way:

$$\text{Expected Revenue(Wedge Engagements)} = R - \text{Expected Revenue(Ongoing Engagements)} - \text{Expected Revenue(Opportunities)} \quad (1).$$

Because the different demand types have different characteristics and different degrees of uncertainty, a separate forecasting module is needed to address each type. In order to integrate the different types of demands, the forecasting result for each demand type is represented in the unified form of a workforce demand statement. The demand statement describes the workforce demand at the engagement level, and is designed to reflect the various uncertainties involved.

For each engagement expected to be active some time during the forecasting period, the demand statement includes start dates and end dates, and staffing plans. Information regarding the start dates and end dates of the engagement could be expected start and end dates, or probability distributions over a range of possible start and end dates.

Staffing plans include information regarding the work hours required for each skill category throughout the engagement. It could be a "static" plan representing average requirements for the entire engagement, or a "variable" plan which specifies different workforce requirements for different stages in time during the engagement.

The workforce demand statements from all three demand types can then be integrated (e.g., 134) to generate the overall workforce demand forecast. One possible way to integrate them is to aggregate all engagement level demand statements, making use of the probability distributions where available, to generate a representative (e.g., average) workforce demand throughout the forecasted period. Another possible way is to directly feed the engagement level demand statements to a capacity planning engine.

To forecast (e.g., 116) the demand for ongoing engagements 102, the method first extracts information regarding ongoing engagements 111, including the actual staffing levels for different skill categories up to date (e.g., number of people or hours per week required for each skill category), estimated revenue for the forecasting period, estimated end date, and engagement category (called a solution) it belongs to, if a workforce requirement based taxonomy of engagements is available.

For an engagement with firm revenue and end date commitments 118, these attributes are taken as is, otherwise the expected revenue and end dates are estimated using a mathematical model based on actual data from the current engagement, and/or similar engagements in the past.

Staffing plans 112 are generated either by extrapolating from up-to-date staffing levels, or by combining up-to-date staffing levels with a standard staffing plan attached to the solution assignment, if it's available.

The staffing plan 112 combined with the end date statistics (the start date statistics is default to at the beginning of the quarter in this case since the project has already started) provides the demand statement 128.

The expected revenue 110 is stored to be used to compute the revenue size of the wedge component.

The opportunities demand forecast is calculated by extracting information regarding sales opportunities 113, including estimated probability of winning 120, expected revenue, expected engagement start date and expected project duration. This information typically comes from a database which keeps subjective assessments given by sales specialists.

These attributes are either taken as provided, or modified by mathematical models that adjust the subjective estimates based on available information to improve their accuracy. One possible form of mathematical models is a regression model.

The staffing plan 114 for each opportunity 104 is generated either by the opportunity manager based on experience, or by using the standard staffing template retrieved through the assigned solution (if available), or a combination of both.

The staffing plan 114 combined with the start date and end date statistics (derived from duration estimates) provides the demand statement 130.

The expected revenue 110 is stored to be used to compute the revenue size used in wedge demand forecasting 124.

During the wedge demand forecasting 124, the revenue size of the wedge engagements (called wedge revenue) is computed by applying formula (1), using expected total revenue 108 (or revenue target) for the forecasting period and expected revenue 110 from the ongoing engagements and the opportunities as specified above.

The workforce requirement for wedge engagements can be estimated by directly mapping revenue to work hours in the following manner The total work hours required to generate wedge revenue is estimated using the average revenue rate (i.e., average revenue to hours claimed ratio).

The distribution of the total required hours over different skills categories is estimated using distributions of hours required by wedge engagements in the past 126. One possible way to generate the estimated distribution is to compute the actual distribution from previous period and apply the same distribution to the forecasting period.

A demand statement is created for a "pseudo engagement" representing all work hours required by wedge engagements, using the aggregated staffing plan generated above, and project start and end dates that coincide with the start and end dates of the forecasting period.

Alternatively, the workforce requirement for wedge engagements can be estimated by first distributing wedge revenue over different solutions, if a workforce requirement based taxonomy of engagements (referred to above) is available. When such taxonomy exists, this alternative approach is more desirable as it can potentially provide solution level insights, such as which solutions are becoming more or less dominant.

Similarly to the method described above, the revenue distribution over different solutions can be estimated using actual distributions in the past periods. Alternatively, the revenue distribution can also be derived from target revenue 131 distributions over different solutions. If such target distributions are available, the wedge revenue size for each solution can be estimated by subtracting from the target revenue of each solution, the expected revenues from ongoing contracts and opportunities of the same solution.

The number of expected engagements of each solution is then estimated based on the revenue and average size of engagements in the particular category.

Distributions of typical start times for each engagement category are estimated using distributions in past periods.

For each forecasted engagement in each solution, the standard staffing plan along with the start date statistics, and the end data statistics (derived from start date statistics and average duration) together form the demand statement 132.

The demand forecasting process can be run in "batch" mode at a fixed forecast each forecasting period. In addition, "incremental" runs can be initiated at any time before or during the forecasting period to take into account any new information. When a batch run or incremental run takes place within the forecasting period, formula (1) needs to be carefully adjusted to account for already completed engagements to ensure correct estimation of the wedge size. Furthermore, the demand forecasting process can also be run simultaneously for multiple forecasting periods.

In one preferred embodiment, the "batch" mode is triggered by a data warehouse ETL (Extraction, Transformation and Loading) process which brings in a large volume of new information periodically from all kinds of operational systems such as order systems for opportunity data, and claim systems for tracking the on-going engagements. The "batch" mode invokes all the steps one-by-one described above, which is also shown in the chart. Then, the "incremental" mode is initialized when the planner reviews the forecasting results, and makes more fine-grained adjustments to the different types of engagements. In the "incremental" mode, a quick and local adjustment is carried out which only involves some of the above steps or sub steps to timely respond to human intervention.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A computer-implemented method of forecasting workforce demand, comprising:
    forecasting, using a computer processor an ongoing engagements demand, said ongoing engagements comprising engagements having a revenue commitment and an end date;
    forecasting an opportunities demand, said opportunities comprising engagements that are in different stages of a sales process and may become signed engagements during a forecasting period and incur a demand on the workforce;
    forecasting a wedge engagements demand, said wedge engagements comprising engagements in the forecasting period that are neither ongoing engagements nor opportunities at a forecasting time;
    representing a result of said forecasting said ongoing engagements demand as a first workforce demand statement, a result of said forecasting said opportunities demand as a second workforce demand statement, and a result of said forecasting said wedge engagements demand as third workforce demand statement, each of said first workforce demand statement, said second workforce demand statement and said third workforce demand statement describes a workforce demand at an engagement level and reflects uncertainties contained in each of said ongoing engagements demand, said opportunities demand and said wedge engagements demand, each of said first workforce demand statement, said second workforce demand statement and said third workforce demand statement comprises:
        start date and end date statistics, comprising information regarding the start date and the end date of the engagement; and
        staffing plans, said staffing plans comprising information regarding work hours required for each skill category throughout the engagement; and
    integrating said first workforce demand statement, said second workforce demand statement and said third workforce demand statement to generate an overall workforce demand forecast,
    wherein said integrating comprises directly inputting said first workforce demand statement, said second workforce demand statement and said third workforce demand statement into a capacity planning engine,
    wherein said forecasting said ongoing engagements demand comprises:
        extracting information regarding said ongoing engagements, including actual staffing levels for different skill categories, estimated revenue for the forecast period, estimated end date, and engagement category; and
        combining said start date and end statistics, and said staffing plans,
    wherein said forecasting said opportunities demand comprises:
        extracting information regarding sales opportunities, including estimated probability of winning, expected revenue, expected engagement start date and expected project duration; and
        combining said start date and end statistics, and said staffing plans, and
    wherein said forecasting said wedge engagements demand comprises:
        computing a revenue size of the wedge engagements using expected total revenue for the forecast period and expected revenue from said ongoing engagements and said opportunities;
        estimating workforce requirements for the wedge engagements;
        estimating total work hours required to generate the revenue for the wedge engagements; and
        combining said start date and end statistics, and said staffing plans.

* * * * *